No. 840,234. PATENTED JAN. 1, 1907.
B. McGREGOR.
TOBACCO STEMMING AND BOOKING MACHINE.
APPLICATION FILED MAR. 13, 1906.

11 SHEETS—SHEET 4.

Witnesses
Harry Henke
M. E. Glass

Inventor
Bradford McGregor
By
James N. Ramsey
Attorney

No. 840,234. PATENTED JAN. 1, 1907.
B. McGREGOR.
TOBACCO STEMMING AND BOOKING MACHINE.
APPLICATION FILED MAR. 13, 1906.

11 SHEETS—SHEET 5.

No. 840,234.　　　　　　　　　　　　　　　　　PATENTED JAN. 1, 1907.
B. McGREGOR.
TOBACCO STEMMING AND BOOKING MACHINE.
APPLICATION FILED MAR. 13, 1906.
11 SHEETS—SHEET 6.
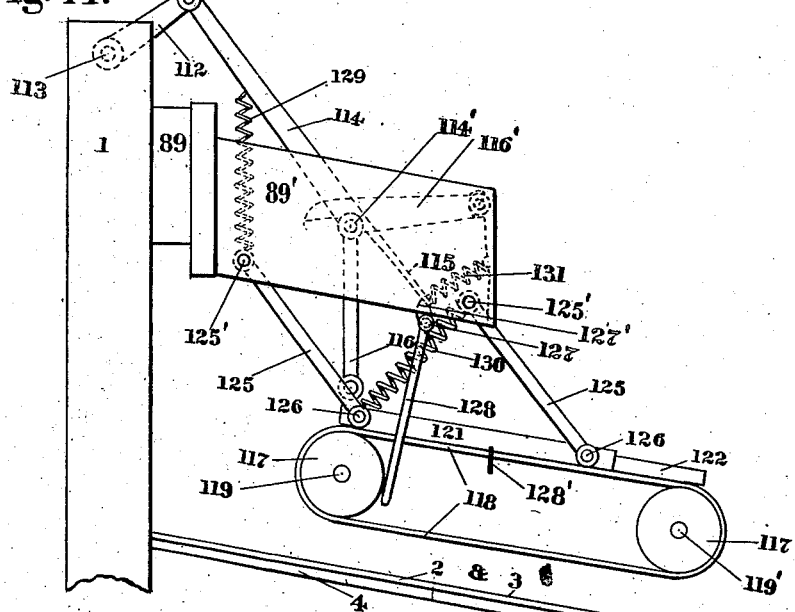
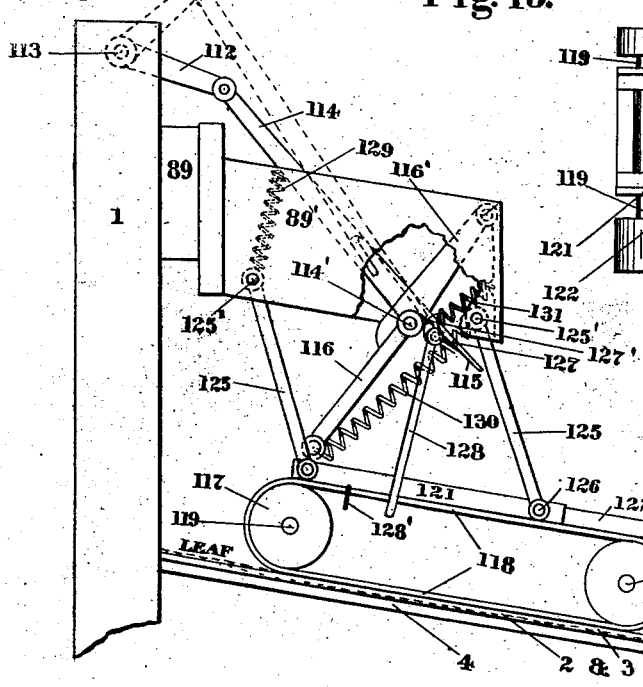
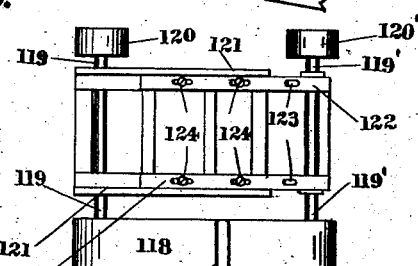
Witnesses
Harry H Henke
M E Glass
Inventor
Bradford McGregor
By James A. Ramsey
Attorney

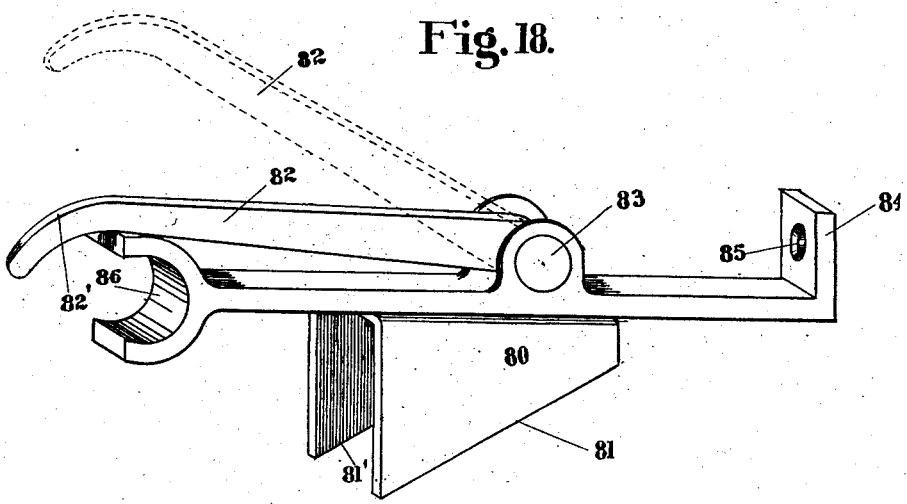

No. 840,234. PATENTED JAN. 1, 1907.
B. McGREGOR.
TOBACCO STEMMING AND BOOKING MACHINE.
APPLICATION FILED MAR. 13, 1906.

11 SHEETS—SHEET 8.

Witnesses
Harry H. Onke
M. E. Glass

Inventor
Bradford McGregor
By James N. Ramsey
Attorney

No. 840,234. PATENTED JAN. 1, 1907.
B. McGREGOR.
TOBACCO STEMMING AND BOOKING MACHINE.
APPLICATION FILED MAR. 13, 1906.

11 SHEETS—SHEET 9.

Witnesses
Harry Henke
M. E. Glass

Inventor
Bradford McGregor
By James H. Ramsey
Attorney

No. 840,234. PATENTED JAN. 1, 1907.
B. McGREGOR.
TOBACCO STEMMING AND BOOKING MACHINE.
APPLICATION FILED MAR. 13, 1906.
11 SHEETS—SHEET 10.
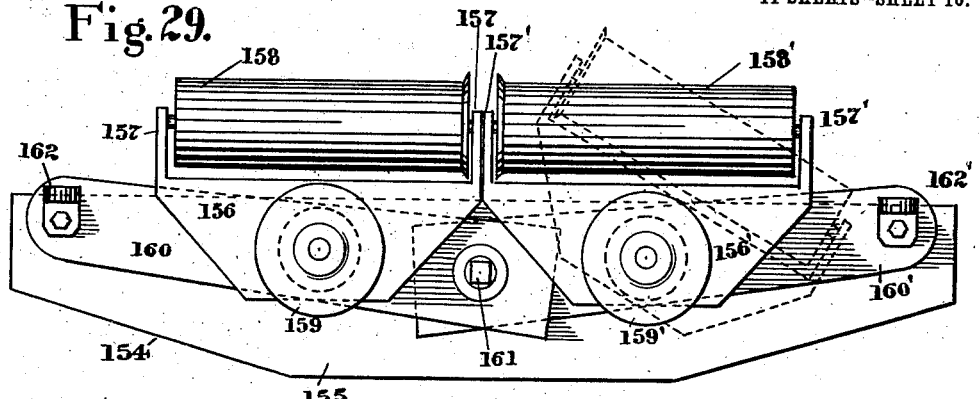
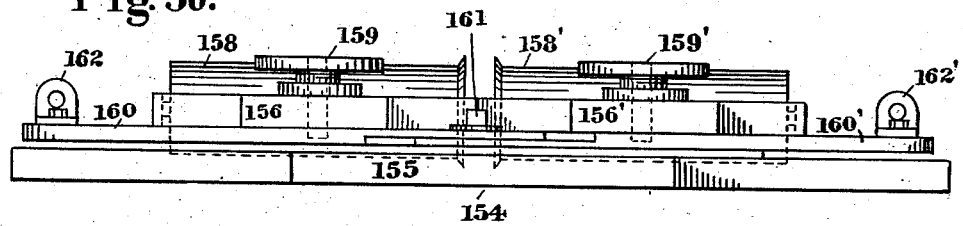
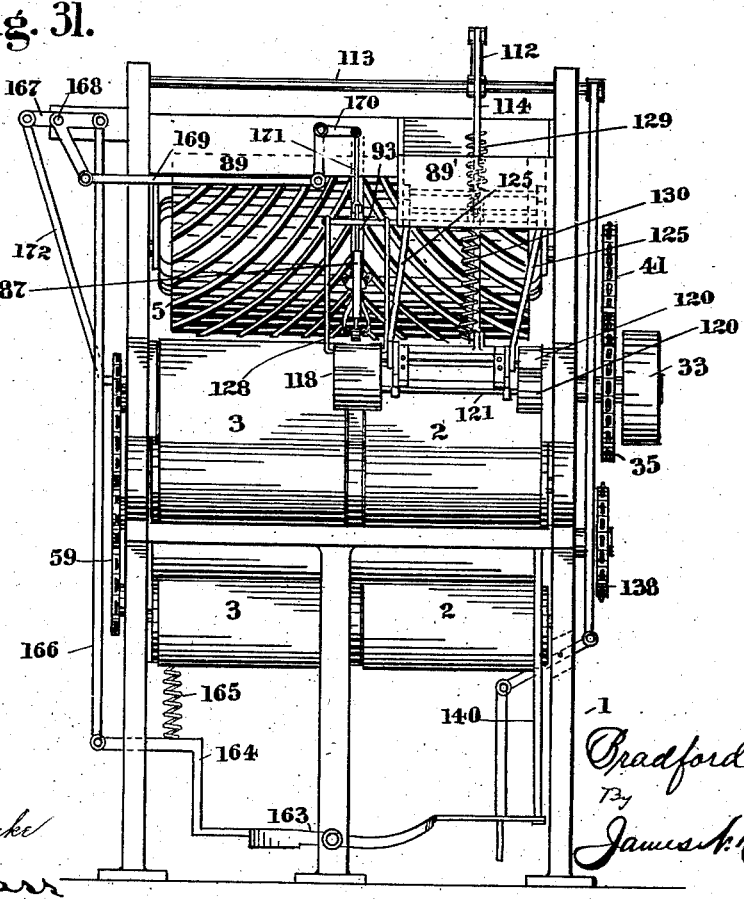

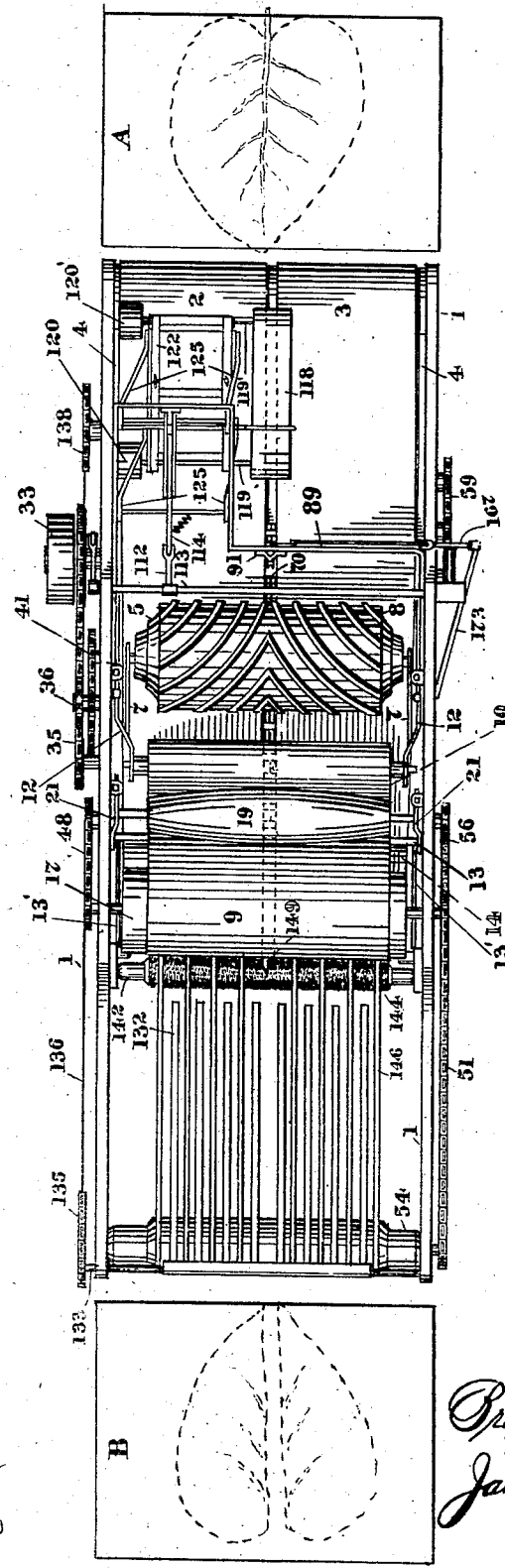

UNITED STATES PATENT OFFICE.

BRADFORD McGREGOR, OF COVINGTON, KENTUCKY, ASSIGNOR OF TWO-FIFTHS TO CHARLES L. DOUGHTY, OF CINCINNATI, OHIO.

TOBACCO STEMMING AND BOOKING MACHINE.

No. 840,234.     Specification of Letters Patent.     Patented Jan. 1, 1907.

Application filed March 13, 1906. Serial No. 305,752.

*To all whom it may concern:*

Be it known that I, BRADFORD MCGREGOR, a citizen of the United States, residing at Covington, in the county of Kenton and State of Kentucky, have invented certain new and useful Improvements in Tobacco Stemming and Booking Machines, of which the following is a specification.

The objects of my invention are to provide a tobacco stemming and booking machine of compact construction, to secure efficient and rapid work, to enable leaves to be fed into the machine in quick succession to be stemmed, smoothed, and booked, to insure certainty of thorough stemming, and to secure other advantages and results.

My invention consists in the tobacco stemming and booking machine and in the parts and combination and arrangement of parts, all substantially as set forth and claimed.

Figure 1:
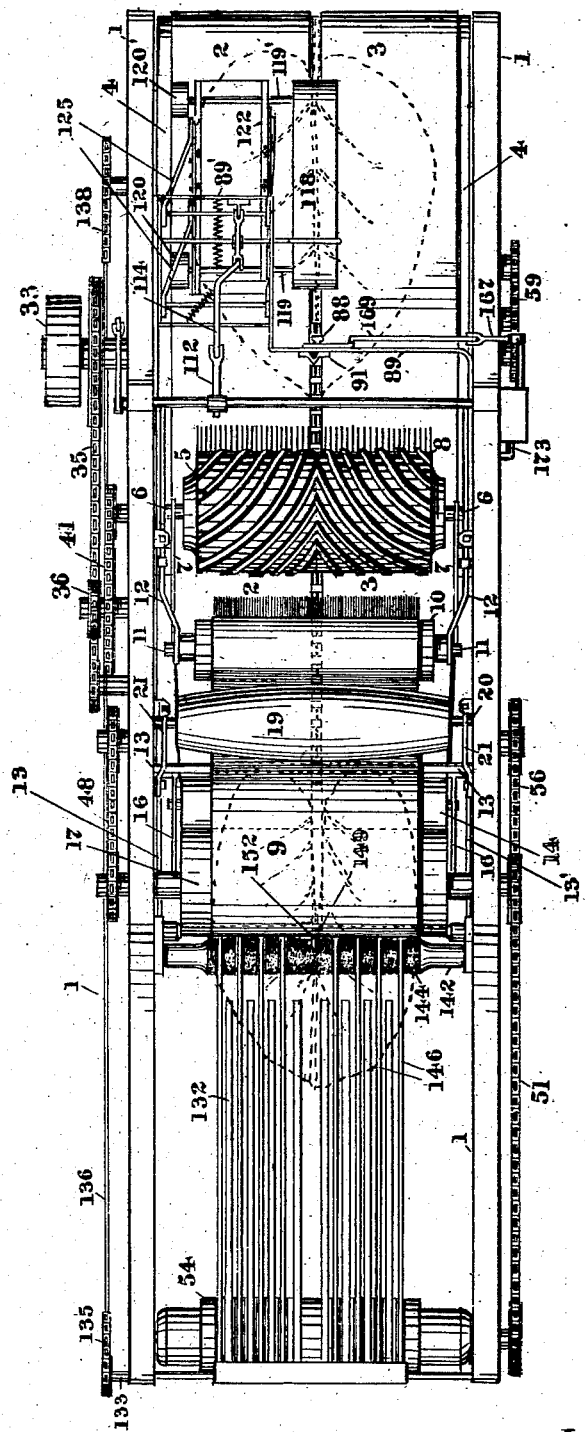
Figure 2:
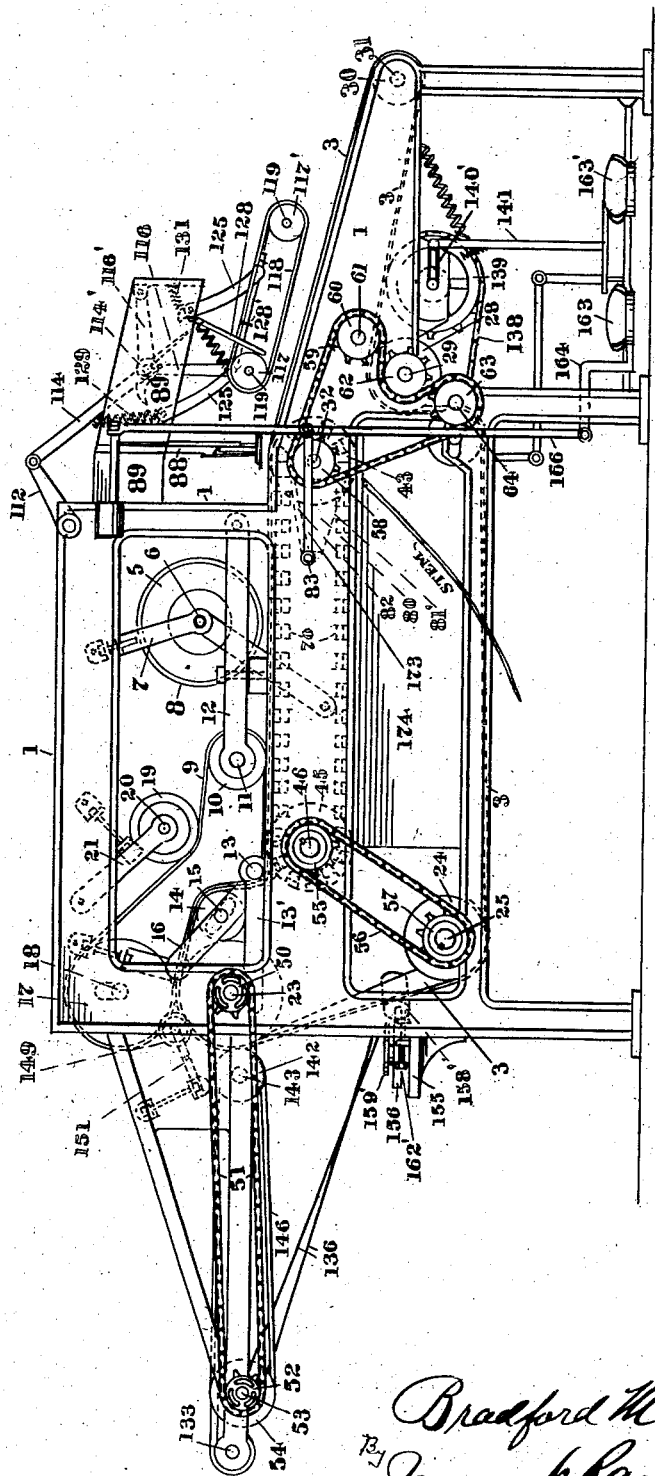
Figure 3:
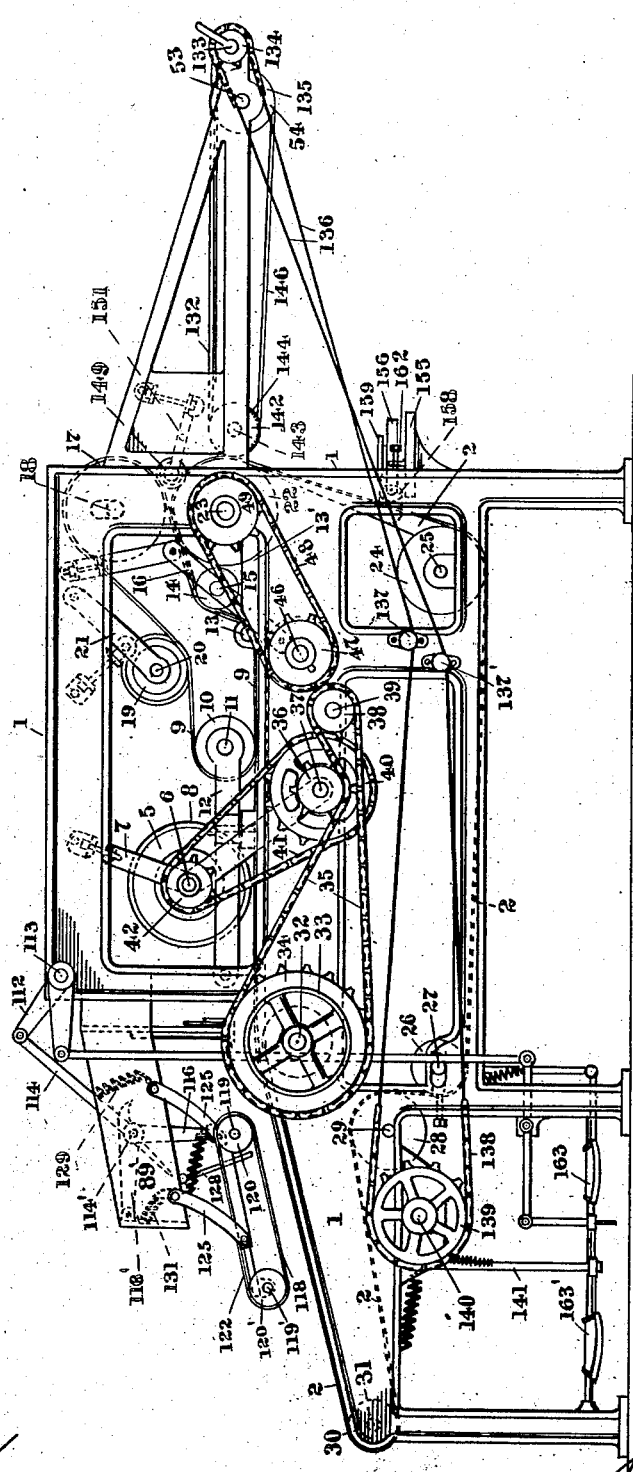
Figure 4:
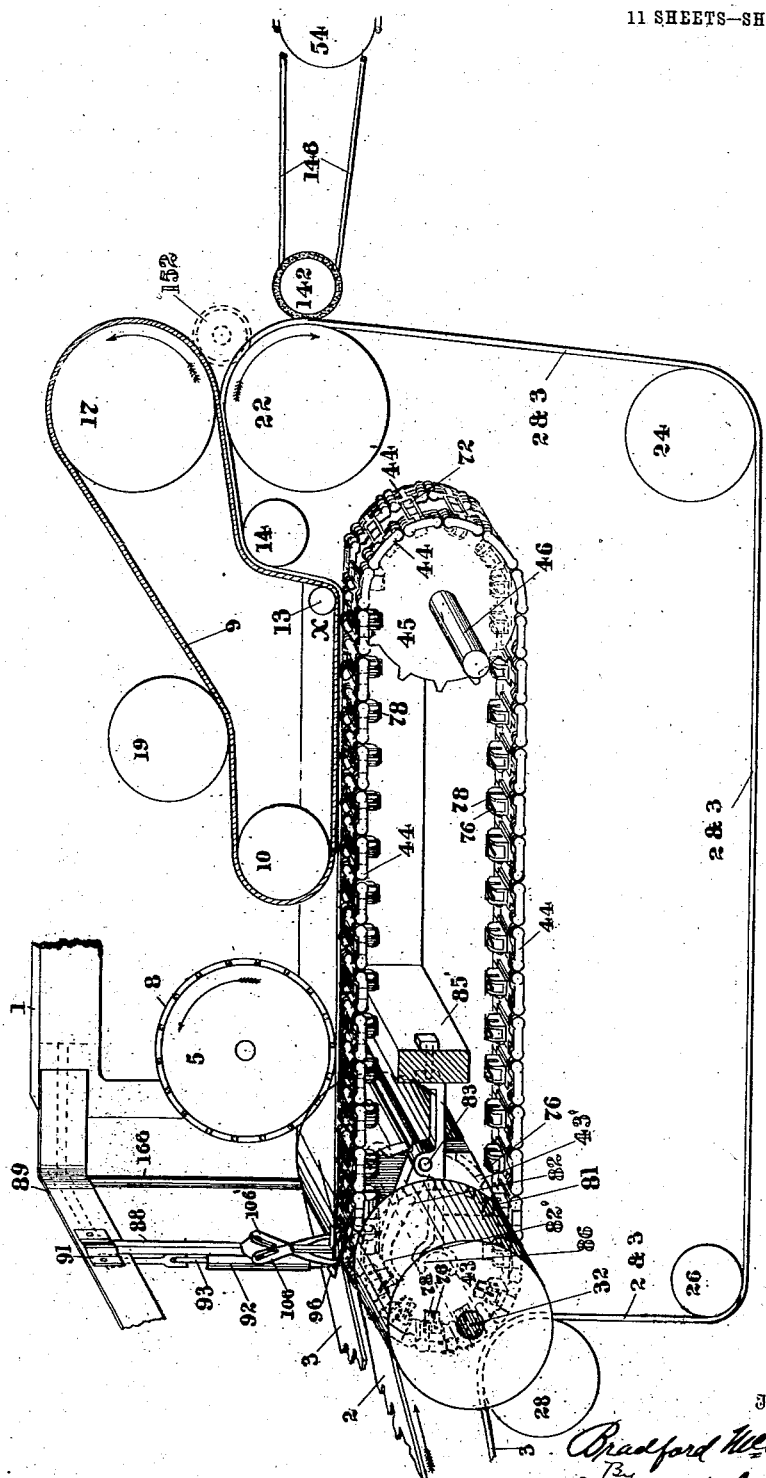
Figure 5:
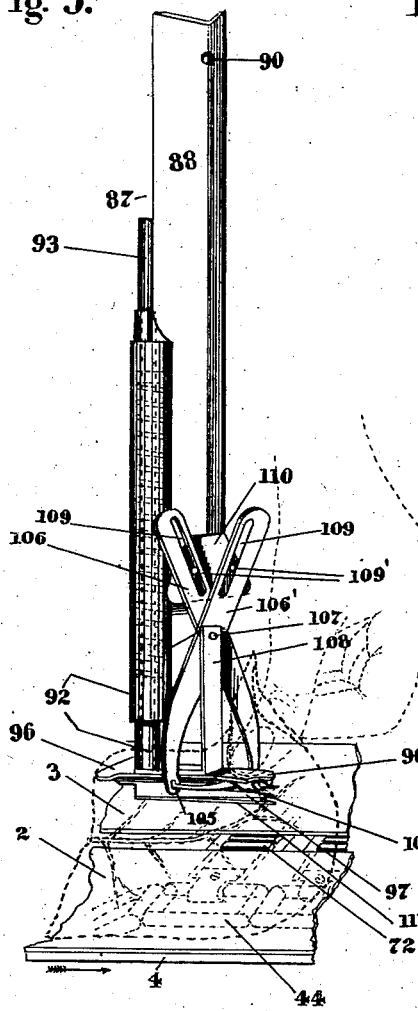
Figure 6:
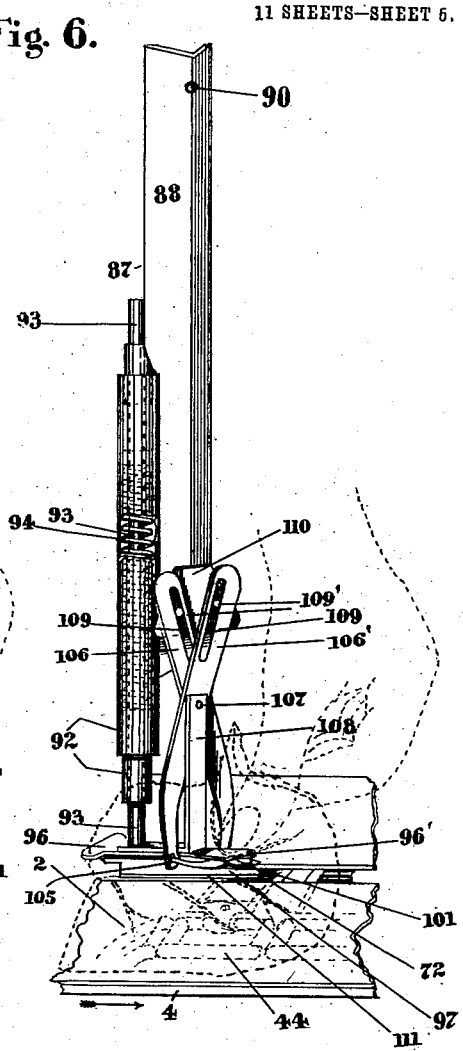
Figure 7:
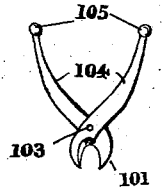
Figure 8:
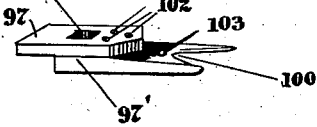
Figure 9:
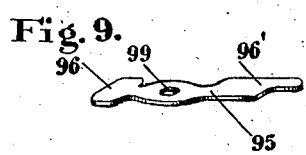
Figure 10:
Figure 19:
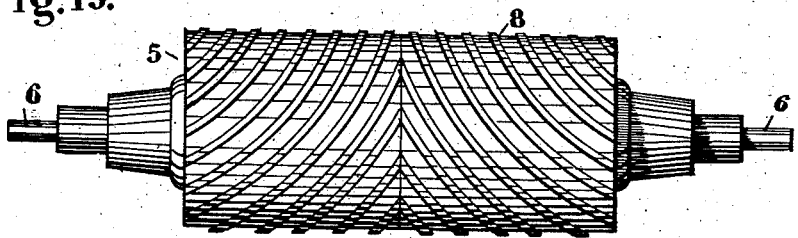
Figure 20:
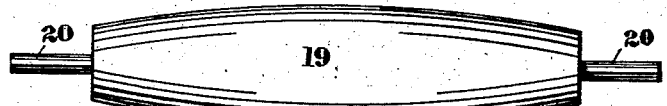
Figure 21:
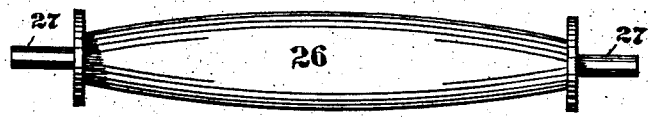
Figure 22:
Figure 23:
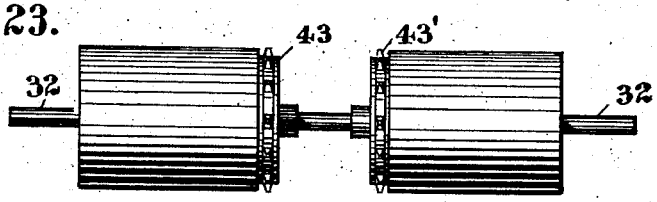
Figure 24:
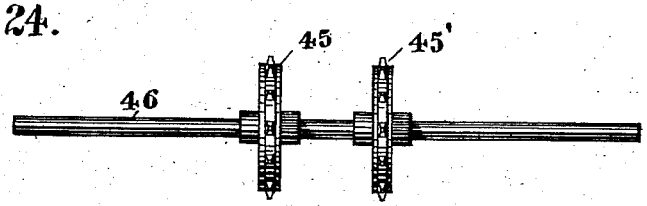
Figure 25:
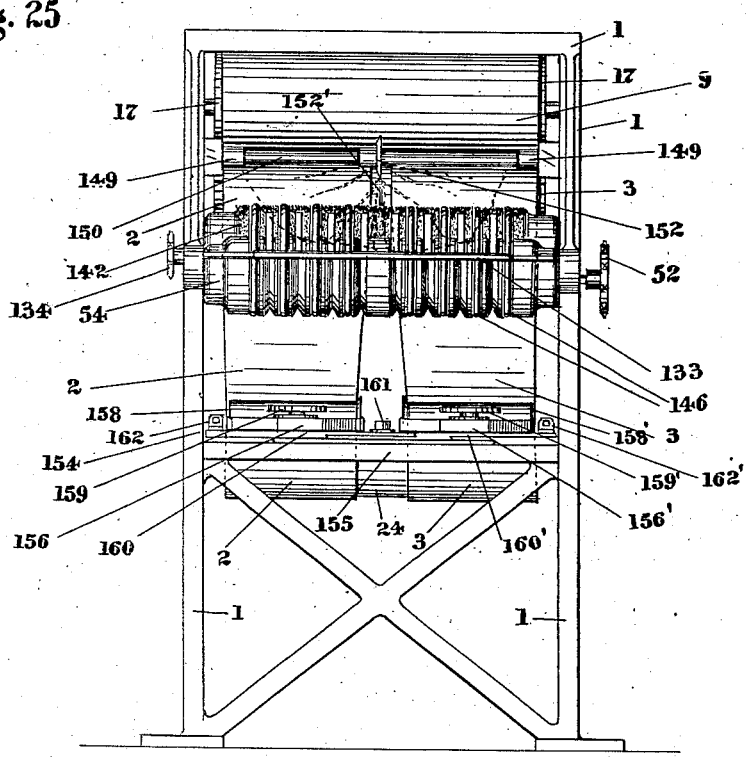
Figure 26:
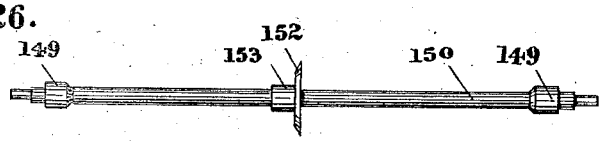
Figure 27:
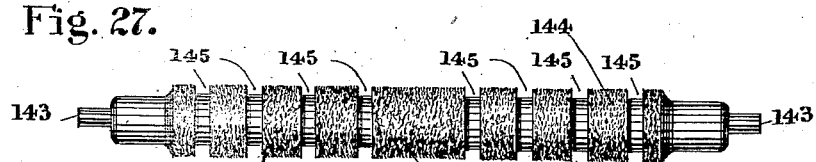
Figure 28:
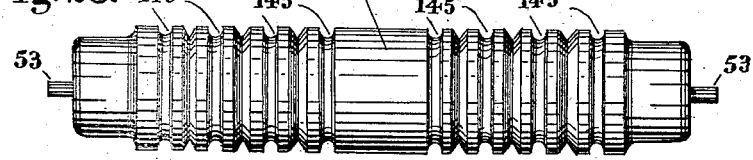

In the accompanying drawings, which serve to illustrate the construction and operation of my machine, Figure 1 is a plan view of my machine. Fig. 2 is a left side elevation of the same. Fig. 3 is a right side elevation of the same. Fig. 4 is a perspective view showing clutch-belt, cutter, and diagram of the various rollers. Fig. 5 is a detail perspective view of the cutter and adjacent clutch mechanism, with a portion of a tobacco-leaf represented by dotted lines having the stem thereof drawn up ready to be cut by the shears. Fig. 6 is a similar view showing the position of the shears after the stem has been cut. Fig. 7 is a detail plan view of the shears of the cutter. Fig. 8 is a perspective view of the shoe of the cutter. Fig. 9 is a perspective view of the thumb-plate of the cutter. Fig. 10 is a perspective view of the spring presser-guide of the cutter. Fig. 11 is an enlarged side elevation of the feeder in elevated position ready to receive the leaf upon the feed-table. Fig. 12 is an enlarged side elevation of the feeder clamped upon the leaf. Fig. 13 is a plan view of the feeder, showing means for lengthening same. Fig. 14 is a perspective view of the clutch in open position. Fig. 15 is a perspective view of the same in closed position. Fig. 16 is a perspective view of the frame for holding the clutch. Fig. 17 is a perspective view of the holding-plate. Fig. 18 is a perspective view of the clutch opening and closing device. Fig. 19 is a view of the smoothing-roll. Fig. 20 is a view of the centering-roll. Fig. 21 is a view of the separating and guiding roll. Fig. 22 is a view of the slotted roll. Fig. 23 is a view of the carrying-rolls and sprockets. Fig. 24 is a view of the sprocket-wheel for the clutch-conveyer. Fig. 25 is a rear elevation of my machine. Fig. 26 is a view of the knife-roll. Fig. 27 is a view of the brush-roll. Fig. 28 is a view of the rear roll of the booker. Fig. 29 is a plan view of the belt-tightener. Fig. 30 is a rear view of the same. Fig. 31 is a front elevation of my machine. Fig. 32 is a plan view of my machine with supply and booking tables in their respective positions.

The machine embodying my invention is preferably constructed substantially as follows:

A suitable framework 1 forms a support for the various parts and to which the various rolls are journaled transversely. Two continuous belts 2 and 3 pass over a feed-table 4, which is securely fastened to the frame 1, thence under a spreading and smoothing-roll 5, fixed upon a shaft 6, journaled into regulating-supports 7 and covered with a corrugated-rubber surface 8 or any other suitable material for smoothing and spreading the leaves, thence under a broad continuous belt 9, which passes around a roll 10, fixed upon a shaft 11, journaled in a regulating arm or support 12; thence under a roll 13, journaled in a regulating-support 13', thence upwardly over a roll 14, fixed upon a shaft 15, journaled at each end into regulating-supports 16. At this point the broad belt 9 passes around a roll 17, fixed upon a shaft 18, journaled at each end in the frame 1 in a suitable manner to allow of adjusting same, thence under a tapered roll 19, fixed upon a shaft 20, journaled at each end in an adjusting or regulating support 21, and thence around the roll 10. The two belts 2 and 3 after passing over roll 14 pass around a roll 22, fixed upon a shaft 23, journaled at each end in the frame 1, thence around a roll 24, fixed upon a shaft 25, journaled in the frame 1, thence around a roll 26, fixed upon a shaft 27, journaled in the frame 1, or may be journaled in a regulating-support, thence over a roll 28, fixed upon a shaft 29, journaled in the frame 1, thence around a roll 30, fixed upon a shaft 31, journaled in the frame 1, thence over the feed-table 4.

Supported in the frame 1 is a drive-shaft 32, to which power is conveyed by a pulley 33. A sprocket-wheel 34 is fixed upon the drive-shaft 32 and engages a sprocket-chain 35, which passes under a sprocket-wheel 36, which is fixed upon a rotary shaft 37, thence around an idler sprocket-wheel 38, which revolves on a stub-shaft 39, which is fixed upon the frame 1. A sprocket-wheel 40, fixed upon the rotary shaft 37, engages a sprocket-chain 41, which passes around a sprocket-wheel 42, fixed upon the shaft 6, which revolves roll 5. Two sprocket-wheels 43 and 43', fixed upon the drive-shaft 32, engage two sprocket-chains 44 and 44', which pass around two sprocket-wheels 45 and 45', which are fixed upon a rotary shaft 46. A sprocket-wheel 47 is fixed upon the rotary shaft 46 and engages a sprocket-chain 48, which passes around a sprocket-wheel 49, fixed upon the shaft 23, which revolves roll 22. A sprocket-wheel 50 is fixed upon the rotary shaft 23 and engages a sprocket-chain 51, which passes around a sprocket-wheel 52, fixed upon a shaft 53, which revolves roll 54, operating the booking-conveying device. A sprocket-wheel 55 is fixed upon the revolving shaft 46 and engages a sprocket-chain 56, which passes around a sprocket-wheel 57, fixed upon the shaft 25, which revolves roll 24. A sprocket-wheel 58 is fixed upon the drive-shaft 32 and engages a sprocket-chain 59, which passes around an idler-sprocket 60, revolving on a stub-shaft 61, thence around a sprocket-wheel 62, which is fixed upon the shaft 29, revolving roll 28, thence around an idler-sprocket 63, revolving on a stub-shaft 64.

A series of clutches, Fig. 14, consisting of a supporting-frame 65, Fig. 16, with two hooked ends 65', is adapted to engage at each end the inner side of each sprocket-chain 44 and 44'. Holding-plates 66, Fig. 17, adapted to fit over the open ends of hooks 65', are secured in position by screws 67 to hold the supporting-frame in engagement with the sprocket-chains 44 and 44'. This frame has recesses 68 and 69 to receive the clutch 70, Fig. 14, and is provided with two screw-holes 71 to receive screws to hold the clutch in position. The clutch proper consists of a frame 70, provided with screw-holes 71', which are adapted to fit over the screw-holes 71 in frame 65, Fig. 16. Two jaws 72, having levers 73 pivoted at 74 to a shaft 75, are connected at their lower ends to an arm 76, which is pivoted to a shaft 77, extending through a guide 78, which is adapted to slide in a slot 79.

An opening and closing device, Fig. 18, for opening and closing the clutches 70, Fig. 14, having a frame 80, is provided with sloping flanges 81 and 81', spaced apart to allow of the passage of the clutches 70 and adapted to engage the arm 76, thereby opening said clutch. An arm 82, fixed upon a shaft 83, journaled in the frame 80 and having a cam-shaped end 82', is adapted to be raised by a treadle connected to shaft 83 in order to come into contact with the sliding guide 78 of the clutch 70, Fig. 14, closing same, as shown in Fig. 15. An angle-shaped end 84, fitted with a bolt-hole 85, adapted to be bolted to a cross-support 85', holds the opening and closing device firmly in position, while its opposite end is formed with a concaved bearing 86 to allow same to fit over the drive-shaft 32 to assist in holding the frame 80 in position.

A cutter 87, Figs. 5 and 6, consisting of an angle-rod 88, is fixed upon a frame 89 with a bolt 90 and held firmly in position by a V-shaped plate 91. To this angle-rod 88 is fixed a cylinder 92, which has a sliding rod 93, operated with a spring 94, at the bottom of which rod is fixed a thumb-plate 95, having thumb-rests 96 and 96', Fig. 9. A shoe 97, Fig. 8, made of two parts 97 and 97', the upper part having a square hole 98 to keep same from revolving, while the lower part 97' has a round hole (not shown) to conform with holes 99 and 99' in the thumb-plate and guide, respectively, and a V-shaped guide 100 for guiding the stem of the tobacco-leaf into the mouth of the shears 101, is secured to the lower end of the sliding rod 93. The two parts 97 and 97' are secured to each other by means of screws 102. The shears 101, Fig. 7, are pivoted at 103 to the shoe 97. The handles of the shears 104 have ball-shaped ends 105, adapted to fit into suitable recesses 105' of the opening and closing guides 106, which are pivoted at 107 into an L-support 108, which is fixed to the sliding rod 93. The guides 106 and 106' are provided with slots 109 and adapted to be guided by the pins 109', which are fixed to a plate 110. A spring presser-guide 111, Fig. 10, fixed to the sliding rod 93 and having a V-shaped end 100', performs the double operation of guiding the stem into the jaws of the shears 101 and pressing the stem into the jaws of the clutch 70, as shown in Fig. 6.

A feeder, Fig. 11, consisting of a supporting-frame 89', is fixed to the frame 1 in any suitable manner. A connecting-link 112 is fixed to a shaft 113, which connects with a treadle. A sliding arm 114, connecting with the link 112, rests on a toggle-joint 114' and has a guide 115 at the end thereof. The toggles 116 and 116' are adapted to be pushed slightly past the center by the arm 114, as shown in Fig. 12. This operation, as will be seen, presses the feeder into contact with the belts 2 and 3 and holds the stem of the leaf in the recess between these belts. The feeder, Fig. 11, has two rolls 117 and 117', which have a continuous belt 118 passing around same to engage and hold the stem in proper position between belts 2 and 3 while it is being clutched and cut. Rolls 117 and 117' are fixed upon two shafts 119 and 119', and at the opposite sides two rolls 120 and 120' are fixed upon the shafts 119 and 119' to engage belt 2 to move belt 118. These shafts are journaled to a frame 121, which has a slide 122, adapted to be regulated to conform with the different-sized leaves. This is accomplished by the slots 123, which are adapted to receive screws 124, the feeder being regulated and the slide held in position by said screws. The frame 121 is connected to the frame 89' by means of connecting-arms 125, pivoted to shafts 125' in frame 89 and pivoted to the frame 121 by pivot-bolts 126.

An automatic device for throwing the toggle 114' into its normal position consists of a shaft 127, which has a cam 127', adapted to engage said toggle-joint and throw same past center, Fig. 12. Two arms 128, one on each side of belt 118, and a small arm 128', fixed upon the belt 118, is adapted to engage arm 128 and carry same backward, thereby throwing the cam 127' forward sufficiently to release the toggle and permit the roll-frame to be returned to raised position, as shown in Fig. 11. A spring 129, fixed upon the arm 114 and shaft 125', holds the arm in proper relation with the toggle. A spring 130, fixed upon the shaft 125' and frame 121, is adapted to pull the feeder upward in its normal position after said toggle has been released. A spring 131, fixed upon frame 89 and to cam 127', is adapted to hold same in its normal position.

A booking device consisting of a fly 132, fixed upon a shaft 133, having a sprocket-wheel 134 at one end thereof which engages a section of sprocket-chain 135, to which is fastened two cords 136, passing through pulleys 137 and 137' and fixed upon a portion of sprocket-chain 138, which passes around a sprocket-wheel 139, which is fixed on a stub-shaft 140, journaled to the frame 1, and having an arm 140' connecting with rod 141, fixed to and adapted to be operated by a treadle 163'.

A brush-roll 142, Fig. 27, fixed upon a shaft 143, journaled into the frame 1, is provided with a suitable covering of brush or carpet 144 and with slots 145, adapted to receive a series of belts 146, which act as conveyers for conveying the leaf onto the fan 132 and pass around the roll 54, Fig. 28, fixed upon the shaft 53, journaled in the frame 1 and provided with slots 145' to receive the belts 146. A knife-roll 149, Fig. 26, consisting of a shaft 150, is journaled in a regulating-support 151 and provided with a beveled revolving knife 152, having a boss 153 fixed thereto and adapted to coöperate with a similar knife 152' in roll 22, having its cutting edge flush with the rubber surface of the roll to cut the top or fore part of the leaf.

A belt-tightener 154, Fig. 29, is provided at the rear of my machine, consisting of a shelf 155, fixed upon the frame 1 and supported in a suitable manner and is provided with two roll-frames 156 and 156' with arms 157 and 157', on which are mounted two rolls 158 and 158', which are adapted to engage the belts 2 and 3 and are regulated by hand-nuts 159 and 159'. The roll-frames 156 and 156' are operated on two supports 160 and 160', which are pivoted to the platform 155 by a bolt 161 and are regulated with two set-screws 162 and 162', as shown in Figs. 2 and 3.

A treadle 163, having any suitable connections, operates the cutter and clutching mechanism of my machine. A suitable connection 164, having a spring 165 to hold same in normal position, is attached to a connecting-rod 166, connected to a V-shaped lever 167, having a fulcrum 168. A connecting-rod 169 connects the V-shaped lever 167 to the two-armed lever 170, connected to the sliding rod 93 of the cutter 87 by means of the connecting-link 171. A connecting-rod 172 connects the V-shaped lever 167 to a rod 173, fixed to the shaft 83 of the clutch opening and closing mechanism. (See Figs. 2 and 31.) A suitable chute 174 is provided under the clutching mechanism for carrying off the stems after they have been clutched from the leaf and released from the clutching mechanism.

The operation of my machine is as follows: A supply-table A is placed at the head or front of my machine, Fig. 32, for holding a supply of tobacco-leaves to be stemmed and is in charge of a helper whose duty it is to place the leaves already in case upon the table with the stems on the lower side and the tip of the leaf toward the machine. The operator then takes up each leaf and places same upon the conveying-belts 2 and 3, which pass over the feed-table, with the stem in the recess or space between these two belts. He then takes the leaf and drawing same forward under the cutter presses down the feeder, Fig. 11, to the position shown in Fig. 12 by pressing downward on the heel of the treadle 163', bringing belt 118 upon the leaf. This holds the leaf firmly in position, with the stem in the recess or space between the two belts 2 and 3. The fore part of the leaf is then taken and the stem drawn into the guides of the cutting device about three or four inches from the tip, as shown in Fig. 5. The operator then presses downward on the heel of treadle 163. This operation brings the cutter and tobacco-leaf down to the clutch mechanism, Fig. 6, closes the shears 101, which cuts the stem of the tobacco-leaf at that point and allows said stem to be pressed into the jaws 72 of the clutches 70 by means of the presser-guide 111. (If the stem is broken in one or more places, the treadle is operated and closes the jaws of the clutch adjacent the front end of the broken section in the rear of the break.) The jaws are then closed, having gripped the stem. This action is simultaneous. Power is then applied to my machine, preferably by an electric motor. The leaf is then conveyed on the conveying-belts 2 and 3, and as it passes under the cutter the stem is pressed into the jaws of the clutching mechanism, whereupon the leaf passes under the spreading-roll 5, which spreads it. The leaf is then conveyed upon said belts 2 and 3 under a broad belt 9, which clamps the leaf between it and said belts 2 and 3 and holds it firmly and smoothly while the leaf is being conveyed past the point X, under roll 13, where the leaf passes upwardly abruptly between said belts and the stem is stripped from the leaf by being drawn forward and then downwardly around sprocket-wheels 45 and 45' by the clutches 70 and carried by the clutching mechanism, as shown in Fig. 4, and released by the opening and closing device 80, provided for that purpose. The stem then slides down a chute 174, which may be replaced by a conveying-belt, if desired, and can be disposed of in any manner desired. In the meantime the leaf is conveyed by belts 2 and 3 under the broad belt 9, which presses the leaf and holds it firmly while the leaf is conveyed between revolving knives 152 and 152', which cut the leaf from the tip to the part already divided by the removal of the stem. Its two halves are then brushed upon the conveying-belts 146 of the booking mechanism by the brush-roll 142 and are conveyed onto the booking-fly 132. The power is then shut off. The operator next presses downward on the toe of treadle 163', which partly revolves the sprocket-wheel 139, which is connected to the fly 132. This operation revolves said fly in a semicircle and deposits the leaf on the booking-table B at the rear end of my machine, the fly being automatically returned by a spring. The feed-roll is released automatically by means of the arms 128 and 129. After the leaf has passed under the cutter and the stem engaged by the clutches the operator presses downward on the toe of treadle 163, which raises the cutter and lowers the cam-arm of the opening and closing device of the clutching mechanism. This treadle may be operated by means of a spring 165, if desired. The operation is repeated for each leaf in this manner. Each leaf is thoroughly stripped, and no tobacco is lost by having particles of the leaf adhere to the stem after it has been taken from the leaf.

While I have shown and described a particular construction and arrangement of parts for booking and stemming tobacco, I do not wish to be understood as limiting myself thereto; but

What I claim, and desire to secure by Letters Patent, is—

1. In a tobacco stemming and booking machine, a frame, a feed-table, a belt thereon, a feeder, a cutter for cutting the stem of the leaf, a spreading-roll for spreading the leaf, a series of clutches for clutching the stem of said leaf, a device for opening and closing said clutches, a continuous belt for holding and clamping the blades of said leaf, revolving knives for separating the blades of said leaf after the stem has been stripped therefrom, a booker, and two continuous belts, passing around a series of rolls, journaled into said frame, and adapted to convey the leaf over said feed-table and under said cutter, spreading-roll, clamping-belt and revolving knife to the booker.

2. In a tobacco stemming and booking machine, two conveying-belts arranged side by side of sufficient width to support the leaf in its entire width and having a narrow space between them adapted to receive and guide the downwardly-extending part of the stem, a clamping-belt extending over the entire width of the leaf and adapted to engage and hold said leaf firmly and smoothly upon said conveying-belts and said stem between said conveying-belts, endless chains arranged and adapted to move beneath said conveying-belts, a series of clutches secured to and between said endless chains, each of said clutches being adapted to clutch the stem at the will of the operator and be automatically released therefrom, and rolls arranged to direct the course of said belts, having the tobacco-leaf clamped tightly between them, abruptly upwardly over a small roll while the clutch is drawing the stem forwardly, thus not only stripping the leaf from the stem but also stripping the vein-leaders from the sides of the stem forming a beaded edge on the stripped sides of the leaf halves.

3. In a tobacco stemming and booking machine, a series of clutches, parallel sprocket-chains, a frame connecting the inner side of said sprocket-chains having recesses adapted to receive said clutches, a plate for holding said frames to said sprocket-chains, jaws adapted to clutch the stems of said leaves, arms connected to said jaws by means of connecting-arms, a sliding guide connected to said arms, an opening and closing device having sloping flanges adapted to engage said arms, a cam-shaped arm adapted to engage said sliding guide and a treadle adapted to operate said cam-arm.

4. In a tobacco stemming and booking machine, a series of clutches, a frame connecting said clutches to two sprocket-chains which pass around sprocket-wheels, a plate for holding said frame to said sprocket-chains, jaws adapted to clutch the stems of said leaves, arms connected to said jaws by means of connecting-arms, a sliding guide connected to said arms, an opening and closing device having sloping flanges adapted to engage said arms, a cam-shaped arm adapted to engage said sliding guide and a treadle adapted to operate said cam-arm.

5. In a tobacco stemming and booking machine, a clutch comprising a frame having a slot, jaws pivoted in said frame, a guide adapted to slide in said slot, an arm pivoted to said guide and to said jaws and means for engaging said arms and guide respectively to open and close said jaws.

6. In a tobacco stemming and booking machine, a clutch comprising a frame having a slot, jaws pivoted to said frame, a guide adapted to slide therein, arms pivoted to said guide and to said jaws and adapted to engage mechanism to open and close said jaws, in combination with a supporting-frame, endless chains and means for securing said supporting-frame thereto.

7. In a tobacco stemming and booking machine, a clutch comprising a supporting-frame adapted to hold said clutch, hooked ends on said supporting-frame adapted to receive links of endless chains and holding-plates adapted to secure said supporting-frame in fixed position upon said chains.

8. In a tobacco stemming and booking machine, endless chains, a clutch adapted to be secured to said endless chains and having jaws extending parallel with the direction of motion of said chains, an opening and closing device comprising a frame, sloping flanges, cam-arms, yoke and angle-bars all arranged and adapted to operate substantially as set forth.

9. In a tobacco stemming and booking machine, a clutch comprising a frame having a slot, jaws pivoted in said frame, a slide in said slot, arms pivoted to said slide and to said jaws, means for securing said clutch to and between endless chains in combination with a cam-arm adapted to engage said guide and a treadle adapted to engage said cam-arm and slide to close the jaws of the clutch.

10. In a tobacco stemming and booking machine, a clutch comprising a frame having a slot, jaws pivoted in said frame, a guide slidably mounted in said slot, arms pivoted to said guide and to said jaws, endless chains, means for securing said clutch to and between said endless chains, sloping flanges arranged in the path of said clutch and adapted to engage the free ends of said arms to open said jaws.

11. In a tobacco stemming and booking machine, a cutter having a suitable support fixed upon the frame of said machine, a cylinder attached to said support, a sliding rod adapted to slide in said cylinder, a spring for operating said rod, a thumb-rest at the bottom of said rod, a shoe under said thumb-rest, shears pivoted to said shoe, means for opening and closing said shears, a presser-guide plate at the bottom of said shoe fixed upon said sliding rod, and a treadle adapted to operate said cutter.

12. In a tobacco stemming and booking machine, a frame, a cutter comprising a suitable support fixed upon said frame, a cylinder attached to said support, a sliding rod adapted to slide in said cylinder, a spring in said cylinder adapted to exert upward pressure upon said sliding rod, a thumb-rest at the bottom of said rod, a shoe attached to said thumb-rest, shears pivoted to said shoe, means for opening and closing said shears, a presser-guide plate at the bottom of said shoe fixed upon said sliding rod and a treadle adapted to operate said cutter.

13. In a tobacco stemming and booking machine, a frame, a cutter comprising a suitable support fixed upon said frame, a cylinder attached to said support, a sliding rod adapted to slide in said cylinder, a spring for operating said rod, a thumb-rest at the bottom of said rod, a shoe under said thumb-rest, shears pivoted to said shoe, an L-support secured to the sliding rod, guides each having slots pivoted to said L-support and to said shears and adapted to engage guide-pins to open and close said shears, substantially as set forth.

14. In a tobacco stemming and booking machine, a frame, a cutter comprising a suitable support fixed upon said frame, a cylinder attached to said support, a sliding rod adapted to slide in said cylinder, a spring for operating said rod, a thumb-rest at the bottom of said rod, a shoe under said thumb-rest, shears pivoted to said shoe, means for opening and closing said shears, a spring presser-guide at the bottom of said shoe fixed upon said sliding rod and a treadle adapted to operate said cutter.

15. In a tobacco stemming and booking machine, rolls, a feeder having a belt on said rolls, a treadle for pressing same in contact with the conveying-belts and means for releasing same automatically.

16. In a tobacco stemming and booking machine, a feeder, rolls therein, a belt on said rolls adapted to press the stem of the leaf into the recess between the conveying-belts, mechanism for adjusting said rolls and means for automatically releasing said feeder.

17. In a tobacco stemming and booking machine, a main frame, a supporting-frame rigidly secured to said main frame, a feeder pivotally connected to said supporting-frame, rolls in said feeder, an endless belt on said rolls, a connecting-link, a toggle pivoted to said supporting-frame and feeder and adapted to be engaged by a sliding arm pivoted to said connecting-link.

18. In a tobacco stemming and booking machine, a main frame, a supporting-frame rigidly secured to said main frame, a feeder pivotally connected to said supporting-frame, rolls in said feeder, an endless belt on said rolls, a connecting-link, a toggle pivoted to said supporting-frame and feeder and adapted to be engaged by a sliding arm pivoted to said connecting-link and a spring adapted to draw the feeder into raised position.

19. In a tobacco stemming and booking machine, a main frame, a supporting-frame rigidly secured to said frame, a feeder pivotally connected to said supporting-frame, rolls in said feeder, an endless belt on said rolls, a toggle pivoted to said supporting-frame and a connecting-link adapted to be engaged by a sliding arm pivoted to said connecting-link, arms on said belt, a cam-shaft, arms on said cam-shaft adapted to engage said arms on said belt to throw said toggle upwardly past the center, and a spring connecting the supporting-frame and feeder to draw the latter into raised position.

20. In a tobacco stemming and booking machine, two belts adapted to convey the tobacco-leaf, means for cutting the stem of the tobacco-leaf transversely near the tip end of the leaf, endless chains, clutches carried by said endless chains adapted to engage the stem of said leaf extending between said belts, a clamping-belt adapted to engage and hold said leaf firmly upon said conveying-belts and rolls arranged to carry said leaf upwardly, tip end first while the clutches are drawing the stem forwardly thereby stripping the stem from the leaf.

21. In a tobacco stemming and booking machine, two belts adapted to convey the tobacco-leaf, means for cutting the stem transversely near the tip end, a clutch adapted to engage the stem of said leaf extending between said belts, a clamping-belt adapted to hold said leaf firmly upon said conveying-belts and said stem between them, rolls arranged to carry said leaf upwardly while the clutch is drawing the stem forwardly thereby stripping the stem from the leaf and means for cutting the tip end of the leaf in two to completely separate the sides after the stem has been stripped therefrom.

22. In a tobacco stemming and booking machine, two belts arranged parallel and spaced apart adapted to convey the tobacco-leaf, means for cutting the stem, clutches adapted to engage the stem of said leaf extending between said belts, a clamping-belt adapted to hold said leaf firmly upon said conveying-belts, rolls arranged to carry said leaf upwardly and means for conveying the clutches forwardly at the same point thereby stripping the stem from the leaf, rolls each having a knife adapted to cut said leaf in two after the stem has been removed and means for placing the leaves upon a booking-table.

BRADFORD McGREGOR.

Witnesses:
JAMES N. RAMSEY,
M. E. GLASS.